United States Patent [19]
Oikawa et al.

[11] Patent Number: 5,710,858
[45] Date of Patent: Jan. 20, 1998

[54] METHOD AND APPARATUS FOR REPRODUCING DIGITAL VIDEO SIGNALS

[75] Inventors: Yuka Oikawa, Chiba; Naofumi Yanagihara, Tokyo; Nobuaki Izumi, Chiba, all of Japan

[73] Assignee: Sony Corporation, Tokyo, Japan

[21] Appl. No.: 518,329

[22] Filed: Aug. 23, 1995

[30] Foreign Application Priority Data

Aug. 25, 1994  [JP]  Japan .................... 6-200878

[51] Int. Cl.$^6$ ........................... H04N 5/783
[52] U.S. Cl. ........................... 386/74; 386/81
[58] Field of Search .................. 386/6–8, 40, 68, 386/124; 360/61, 64, 69, 32, 73.08, 73.05; H04N 5/783

[56] References Cited

U.S. PATENT DOCUMENTS

| | | | |
|---|---|---|---|
| 5,155,477 | 10/1992 | Shirochi | 340/784 |
| 5,315,401 | 5/1994 | Okada et al. | 358/337 |
| 5,377,050 | 12/1994 | Yun | 360/32 |
| 5,434,677 | 7/1995 | Oikawa | 358/335 |
| 5,583,650 | 12/1996 | Lane et al. | 386/81 |

FOREIGN PATENT DOCUMENTS

| | | | |
|---|---|---|---|
| 0 424 138 A3 | 10/1990 | European Pat. Off. | H04N 5/93 |
| 0 603 875 A | 6/1994 | European Pat. Off. | |
| 0 606 856 A2 | 7/1994 | European Pat. Off. | |

*Primary Examiner*—Andrew Faile
*Assistant Examiner*—Vincent F. Boccio
*Attorney, Agent, or Firm*—William S. Frommer; Alvin Sinderbrand

[57] ABSTRACT

A method and an apparatus for reproducing digital video signals in which every one-frame data of the digital video signals are recorded on n tracks of a recording medium by an inclined azimuth recording system are varying speed reproduced by a rotary head having n heads with a varying playback speed such that $A = a(t \cdot m \pm 1)/n$, where a is a constant equal to 1 or 2 and m is a constant which is an integer other than 0. A picture corresponding to the digital video signals read out with the varying playback speed S is displayed on the screen. In this manner, non-continuous lines caused by temporal difference in neighboring macroblocks during varying speed reproduction may be rendered less obtrusive for improving the picture quality of the varying speed reproduced picture.

7 Claims, 14 Drawing Sheets

4 HEADS CASE1
DOUBLE AZIMUTH HEAD × 2

4 HEADS CASE2

**8 HEADS DOUBLE
AZIMUTH HEAD × 4**

METHOD AND APPARATUS FOR REPRODUCING DIGITAL VIDEO SIGNALS

CROSS-REFERENCES TO RELATED PATENTS

As applications pertinent to the present application, JP Patent Applications Nos. 05-056576 (filing date, Feb. 22, 1993), 05-195533 (filing date, Jul. 13, 1993), 05-287702 (filing date, Oct. 22, 1993) and 06-142042 (filing date, Jun. 23, 1994) have been proposed by the present Assignee. U.S. applications corresponding to these application are now pending. Each of the above applications is owned by the present Assignee and is hereby incorporated by reference.

BACKGROUND OF THE INVENTION

1. Field of the Invention

This invention relates to a method and apparatus for reproducing a recording medium having digital video signals recorded thereon by an inclined azimuth recording system. More particularly, it relates to a method and apparatus for reproducing digital video signals by varying speed reproduction.

2. Descriptio of the Related Art

Recently, developments of a digital video tape recorder (digital VTR) in which signals digitized from high-definition analog picture signals or high definition digital picture signals are encoded (compressed) using a high efficiency encoding system, such as discrete cosine transform (DCT), and the resulting encoded data is recorded on or reproduced from a magnetic tape (video tape) by a rotary head, are proceeding briskly.

Such digital VTR employs the so-called inclined azimuth recording system in which the gap directions of two rotary heads recording and/or reproducing signals on neighboring tracks are inclined relative to each other. The digital VTR records/reproduces one frame of encoded data on or from plural tracks on the video tape.

For repeatedly reproducing a given track of the above-described inclined azimuth recording system, an output is derived only from the rotary head whose angle of inclination of the gap direction (azimuth angle) coincides with the direction of magnetization of the track. That is, since no output is derived from the rotary head whose azimuth angle is not coincident with the direction of magnetization of the track, signals of two fields are alternately reproduced by having tracks with the coincident directions of magnetization traced by the two rotary heads by controlling the tape feed stop position.

There is also known such a digital VTR in which third and fourth rotary heads having azimuth angles opposite to those of the above-mentioned two heads, referred to herein as first and second rotary heads, are mounted in the vicinity of these first and second heads, so that the tracks whose directions of magnetization are not coincident with the azimuth angles of the first and second heads are reproduced by the third and fourth heads for producing perpetually stable playback signals.

For carrying out varying speed reproduction for the above-described digital VTR, as distinct from the normal speed reproduction in which the heads are caused to trace track patterns sequentially for reproducing track data recorded on the video tape, the heads are caused to run obliquely relative to the patterns for reproducing track data recorded on the video tape.

That is, for varying speed reproduction, the time to tape displacement, which is 1:1 for-normal speed reproduction, is set to 1:3 and 3:1 for triple-speed reproduction and for ⅓ slow reproduction, respectively.

For reproducing data by varying speed reproduction, more specifically, for triple-speed reproduction of a video tape, having one-frame data recorded on 20 tracks, namely tracks $A_1$, $B_1$, $A_2$, $B_2$, $A_3$, $B_3$, ... $A_{10}$, $B_{10}$, using double azimuth heads A and B, as shown in FIG. 1, when the head A is moved from the track $A_1$ to track $A_2$ and the head B is moved from the track $B_1$ to track $B_2$, for reproducing the first frame F1, data of regions $D_{A1}$ and $D_{A2}$ of the tracks $A_1$ and $A_2$, whose directions of magnetization are coincident with the azimuth angles of the head A, and data of regions $D_{B1}$ and $D_{B2}$ of the tracks $B_1$ and $B_2$, whose directions of magnetization are coincident with the azimuth angles of the head B, are reproduced.

As for the second and third frames F2 and F3, the heads A and B trace the tracks in the same way as those of the first frame F1. One-frame data is reproduced by the heads tracing the tracks of the frames F1, F2 and F3 20 times.

The one-frame varying speed reproduced picture, obtained as described above, is an aggregation of data $D_{F1}$ picked up from the first frame F1, data $D_{F2}$ picked up from the second frame F2 and data $D_{F3}$ picked up from the third frame F3, as shown in FIG. 2. These first to third frames are shown in FIG. 1, and data $D_{F1}$, $D_{F2}$ and $D_{F3}$, picked up from each of these frames, are referred to herein as macro-block data. That is, one picture is constituted by data of fractions of a number of different frames.

Thus the picture becomes ill-looking and unnatural depending upon the state of data mixing of fractions of plural different frames. That is, since neighboring macro-blocks cannot be constituted by data of temporally neighboring frames, a number of boundary lines due to temporal difference of the neighboring macro-blocks appear on the varying speed reproduced picture.

SUMMARY OF THE INVENTION

It is therefore an object of the present invention to provide a method and apparatus for reproducing digital video signals in which lines of discontinuation caused by temporal difference of neighboring macro-blocks during varying speed reproduction may be rendered less obtrusive for improving the quality of the varying speed reproduced picture.

In one aspect, the present invention provides a method for reproducing digital video signals recorded on a recording medium by an inclined azimuth recording system, wherein, during varying speed reproduction, varying speed reproduction is carried out by setting a varying playback speed S so that $S=a(t\cdot m\pm1)/n$, where n is the number of heads, a is a constant of 1 or 2, t is the number of tracks on which one-frame data of the digital video signals is recorded, and m is a constant which is an integer other than 0.

The digital video signals read out with the varying playback speed are allocated and displayed at positions on a picture associated with the digital video signals.

In another aspect, the present invention provides an apparatus for reproducing digital video signals in which digital video signals recorded by a rotary head unit having n heads in accordance with an inclined azimuth recording system so that one frame data of the digital video signals are recorded on n tracks of the rotary head unit are read out and in which a picture corresponding to the digital video signals thus read out is displayed on a screen by picture display processing means. The apparatus includes driving control means for achieving varying speed reproduction of the digital data during varying speed reproduction with a varying playback speed $S=a(t \cdot m \pm 1)/n$, where a is a constant equal to 1 or 2 and m is a constant which is an integer other than 0.

A picture display processor allocates and displays digital video signals read out with the varying playback speed at positions on a picture associated with the digital video signals.

With the method and apparatus for reproducing the digital video signals, a varying playback speed S for varying speed reproduction is set so that $S=a(t \cdot m \pm 1)/n$ where n is the number of heads, a is a constant of 1 or 2, t is the number of tracks on which one-frame data of the digital video signals is recorded, and m is a constant which is an integer other than 0. The digital video signals recorded by an inclined azimuth recording system are varying speed reproduced at the varying playback speed S. The picture display processor displays a picture corresponding to the digital video signals read out at the varying speed playback speed. In this manner, non-continuous lines caused by temporal difference in neighboring macro-blocks during varying speed reproduction maybe rendered less obtrusive for improving the picture quality of the varying speed reproduced picture.

BRIEF DESCRIPTION OF THE DRAWINGS

FIG. 8 illustrates head tracing for a case in which continuous data can be picked up by the same head, with the varying reproducing speed being 5.25.

DESCRIPTION OF THE PREFERRED EMBODIMENTS

Figure 1:
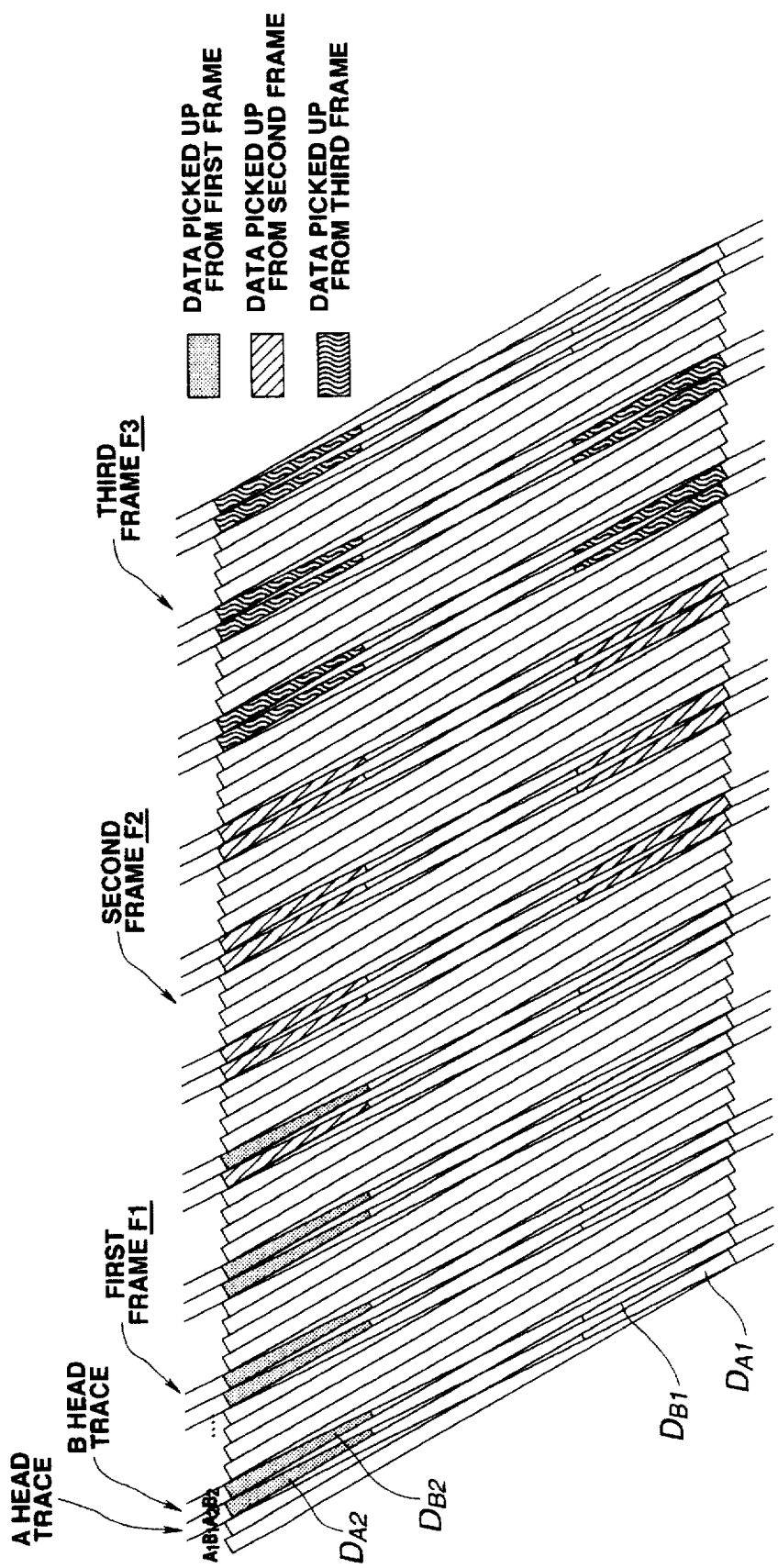
FIG. 1 illustrates head tracing on a video tape during varying speed reproduction and picked-up data in the conventional method for reproducing digital video signals.
Figure 2:
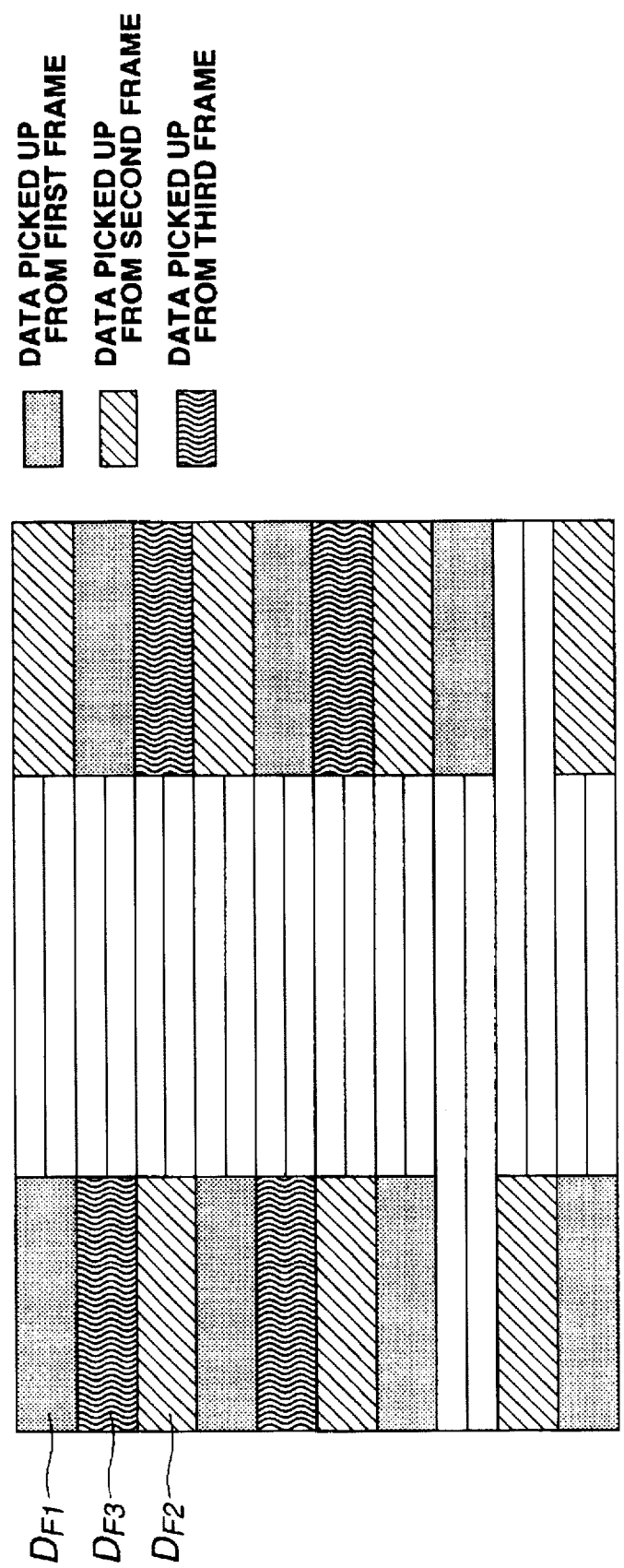
FIG. 2 illustrates positions on the picture of data picked up during varying speed reproduction in accordance with the method shown in FIG. 1.

Referring to the drawings, preferred embodiments of the present invention will be explained in detail.

First, the method for reproducing digital video signals according to a first embodiment of the present invention will be explained.

Figure 3:
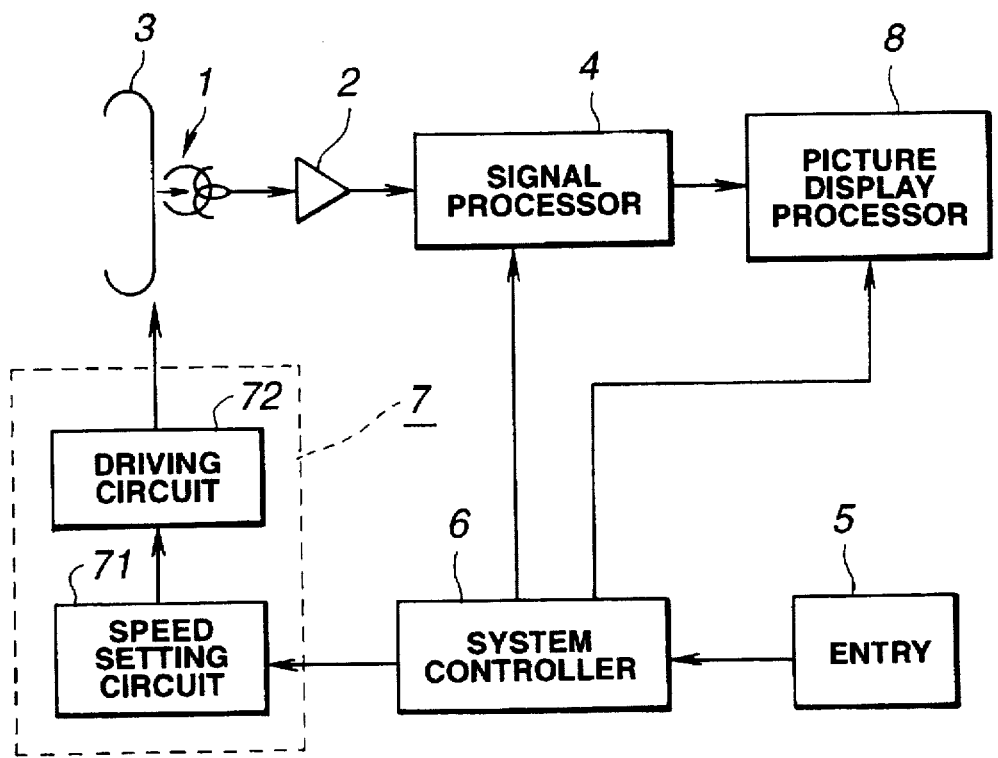
FIG. 3 is a block diagram showing an arrangement of an digital video signal reproducing apparatus for carrying out the digital video signal reproducing method according to a first embodiment of the present invention.

The method for reproducing digital video signals is carried out by a digital video tape recorder (digital VTR) having a reproducing apparatus for digital video signals constructed as shown in FIG. 3.

The reproducing apparatus includes a rotary head unit 1, made up of two pairs of double azimuth heads, a playback amplifier 2 and a signal processor 4 for decoding encoded data reproduced from a magnetic tape (video tape) 3. The reproducing apparatus also includes an entry unit 5 for setting e.g., a varying speed reproducing mode, and a system controller 6 for controlling the digital VTR in its entirety in accordance with the mode as set by the entry unit 5. The reproducing apparatus also includes a driving controller 7 for running the video tape 3 at an optimum multiple speed in association with the head constitution during the varying speed reproducing mode under control by the system controller 6, and a picture display processor 8 for allocating data read out from the video tape 3 with the above optimum multiple speed to associated positions in the picture for displaying the picture.

The rotary head unit 1 is comprised of two pairs of double azimuth heads, that is a first double azimuth head pair, made up of a head HA1 of an azimuth A and a head HB1 of an azimuth B, and a second double azimuth head pair, made up of a head HA2 of the azimuth A and a head HB2 of the azimuth B, as shown in FIG. 3. The head unit 1 is configured so that continuous data will be picked up by the same heads.

On the video tape 3, digital video signals are recorded by the inclined azimuth recording system.

Figure 5:
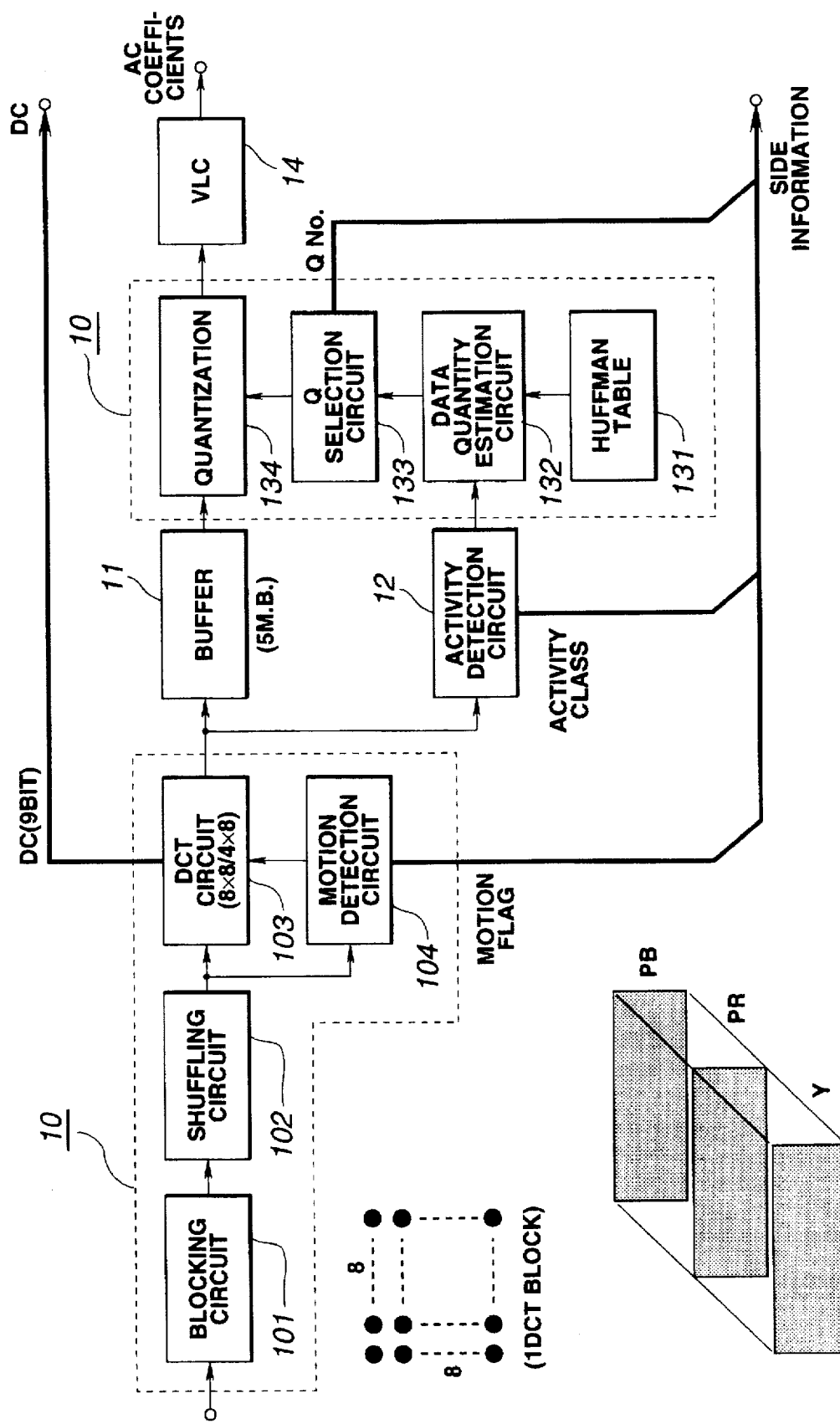
FIG. 5 is a block diagram showing an arrangement of an encoder of the recording system of the reproducing apparatus shown in FIG. 3.

Specifically, the recording system of the digital VTR has an encoder shown in FIG. 5. The digital video signals are recorded on the video tape 3 by the recording system in accordance with the inclined azimuth system.

That is, the encoder includes an orthogonal transform unit 10 for processing blocked picture data with discrete cosine transform (DCT), a picture memory 11 and an activity detection circuit 12 for detecting the activity classes. The encoder also includes a quantization unit 13 for selecting a quantizer per five macro-blocks for carrying out quantization, and a variable length encoding circuit 14 for variable length encoding a quantization output.

The orthogonal transform unit 10 includes a blocking circuit 101 for dividing picture data into blocks each made up of an 8×8 array of pixels, and a shuffling circuit 102 for shuffling five macro-blocks. The orthogonal transform unit also includes a DCT circuit 103 and a motion detection circuit 104 for effecting motion detection on the macro-block basis.

The quantization unit 13 includes a Huffman table 131, which is a table for variable length encoding, and a data quantity estimation circuit 132 for calculating the post-quantization data quantity. The quantization unit also includes a quantization step selection circuit 133 for selecting the quantization step and a quantizer 134 for effecting quantization with the selected quantization step.

The video signals, converted into digital signals, are supplied to the above-described encoder.

The blocking circuit 101 divides input digital video signals into blocks each made up of an array of 8×8 pixels, and routes picture data of the respective blocks to the shuffling circuit 102.

The shuffling unit 102 collects five of the macro-blocks which are separated from one another on the picture to form a video segment which is supplied to the DCT circuit 103 and the motion detection circuit 104.

The motion detection circuit 104 detects the motion of the video segment from the shuffling circuit 102 and routes the detection information as to the 8 pixel by 8 pixel intra-frame mode or the 4 pixel by 4 pixel by 2 inter-field mode to the DCT circuit 103, while outputting the same information as the subsidiary information to the reproducing apparatus shown in FIG. 1.

The DCT circuit 103 performs two-dimensional DCT, with the block size of 8 pixels by 8 pixels, in terms of five macro-blocks, shuffled on the picture by the shuffling circuit 102, as a unit. The DCT circuit 104 is responsive to the detection information from the motion detection circuit 104 to select and switch between intra-frame pixel values in the array of 8 pixels by 8 pixels and the inter-field prediction error values in the array of 4 pixels by 8 pixels by 2 in order to effect two-dimensional DCT. The DCT circuit 103 routes dc components of the DCT coefficients to a dc component quantizer, not shown, while routing ac components of the DCT coefficients to the picture memory 11 and to the activity detection circuit 12. The dc component quantizer performs simple linear quantization on the dc components.

The picture memory 11 temporarily stores the ac components supplied thereto from the DCT circuit 103.

The activity detection circuit 12 detects the maximum value of the ac components from the DCT circuit 103 and classifies the ac components depending upon the maximum value. The classification information is supplied to a data quantity estimation circuit 132, while being supplied as the subsidiary information to the reproducing apparatus shown in FIG. 1.

The ac components temporarily stored in the picture memory 11 are outputted to the quantizer 134.

The data quantity estimation circuit 132 calculates a post-quantization data quantity based upon the classification information from the activity detection circuit 12 and the codes of the Huffman table 131. The results of calculation are outputted to the quantization step selection circuit 133.

The quantization step selection circuit 133 selects the quantization step, depending upon the results of calculation from the data quantity estimating circuit 132, and outputs the number of the selected quantization step to the quantizer 134, while outputting the same quantization step number as the subsidiary information to the reproducing apparatus shown in FIG. 1.

The quantizer 134 quantizes the ac components from the picture memory 11 at the quantization step selected by the quantization step selection circuit 133, and outputs the quantized ac components to the variable length encoding circuit 14.

The variable length encoding circuit 14 variable length encodes the ac components quantized by the quantizer 134, such as by Huffmann encoding, and outputs the variable length encoded ac components.

The dc components and the ac components, quantized and variable length encoded as described above, are deshuffled by a deshuffling circuit, not shown, so as to be re-arrayed in a sequence in which the macro-blocks become continuous on the picture. The re-arrayed macro-blocks are recorded at pre-set positions on the video tape 3 shown in FIG. 3.

Figure 6:
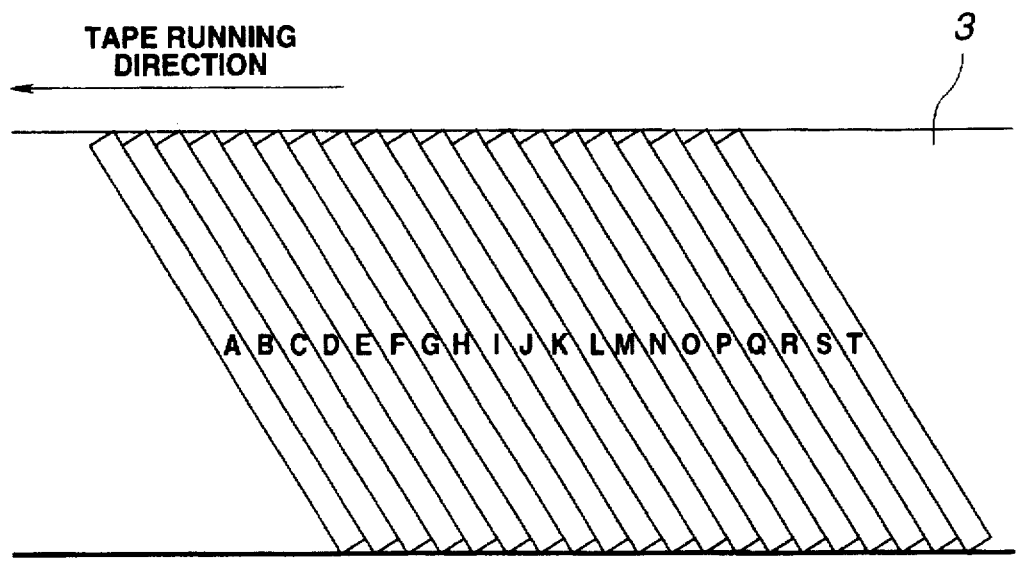
Figure 7:
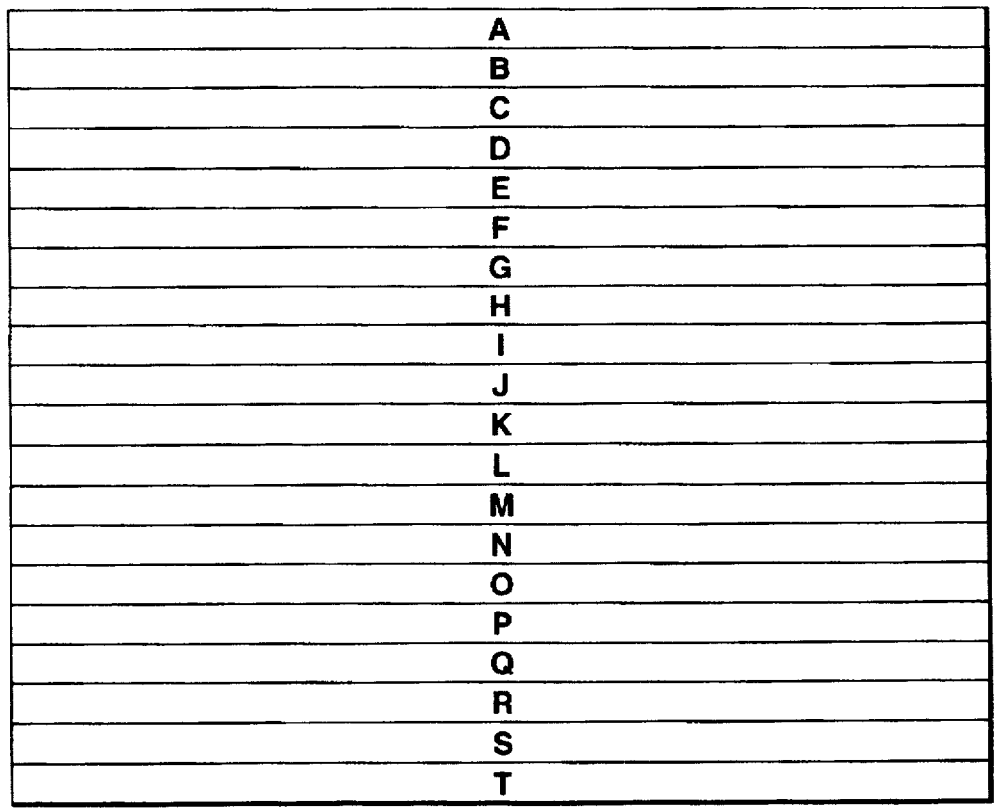
FIG. 7 shows the relation between the data positions on the picture and data positions on the video tape.

That is, since the digital picture data are processed in terms of five macroblocks, shuffled on the picture, as a unit, and deshuffled before being recorded on the video tape 3, data A, B, C, ... S, T on the video tape 3 shown in FIG. 6 may be readily associated with data A, B, C, ... S, T on the picture. Therefore, when recording one-frame data on e.g., 20 tracks, the 20-track data thus recorded are associated with 20 transversely divided portions on the picture.

The motion detection information, activity detection information and the quantization step number, outputted from the recording system having the above-described encoder, are supplied to the signal processor 4 via the system controller 6 shown in FIG. 1.

The signal processor 104 decodes and inverse discrete cosine transforms the encoded data recorded by the recording system on the video tape 3, that is variable-length codes, in accordance with the motion detection information, activity detection information and the quantization step number from the recording system, for expanding the video signals, recorded in the compressed state, into the original base-band video signals.

The entry unit 5 sets one of the normal playback mode and the varying speed playback mode and outputs the set mode as a mode setting signal.

The system controller 6 control the entire system so that so that the operation will take place under the set mode.

For example, during the varying speed playback mode, the driving control unit 7 is controlled so that, by utilizing he tracking signals, such as automatic tracking control (ATF) signals or the like tracking signals, the phase information will be additionally employed in the speed control of the video tape 3. Thus the tracing of the rotary head 1 is perpetually maintained at the same relative position with the tracks on the video tape 3.

The drive control unit 7 is made up of a speed setting circuit 71 for setting the speed of the video tape 3 responsive to the mode under control of the system controller 6 and a driving circuit 72 for running the video tape 3 at a speed as set by the speed setting circuit 71 and for driving the rotary head.

During varying speed reproduction, the speed setting circuit 71 sets an optimum multiple speed of the video tape 3 depending upon the number heads of the rotary head unit 1. The optimum multiple speed is referred to herein as a varying playback speed S.

That is, the varying playback speed S is set to $$S = a(t \cdot m \pm 1)/n \qquad (1)$$

wherein n denotes the number of heads, a is a constant equal to 1 or 2, t is a number of tracks required for recording one-frame picture data and m is a constant which is an integer other than 0.

In the present embodiment, in which the number of heads n is 4, the number of tracks t is 20, the varying playback speed S is given by $$\begin{aligned} S &= (20m \pm 1)/4 \qquad (2) \\ &= a(5m \pm 0.25) \end{aligned}$$

where the plus sign "+" and the minus sign "−" ± in the equation (i) correspond to the normal and reverse directions respectively.

If, in the above equation (2), the running direction is the normal direction, and the constants a and m are a=1 and m=1, that is if the varying playback speed S=5.25, the driving circuit 72 runs the video tape 3 at the varying playback speed S=5.25 as set by the speed setting circuit 71.

The data picked up by the tracing of the rotary head 1 is now explained.

Figure 8:
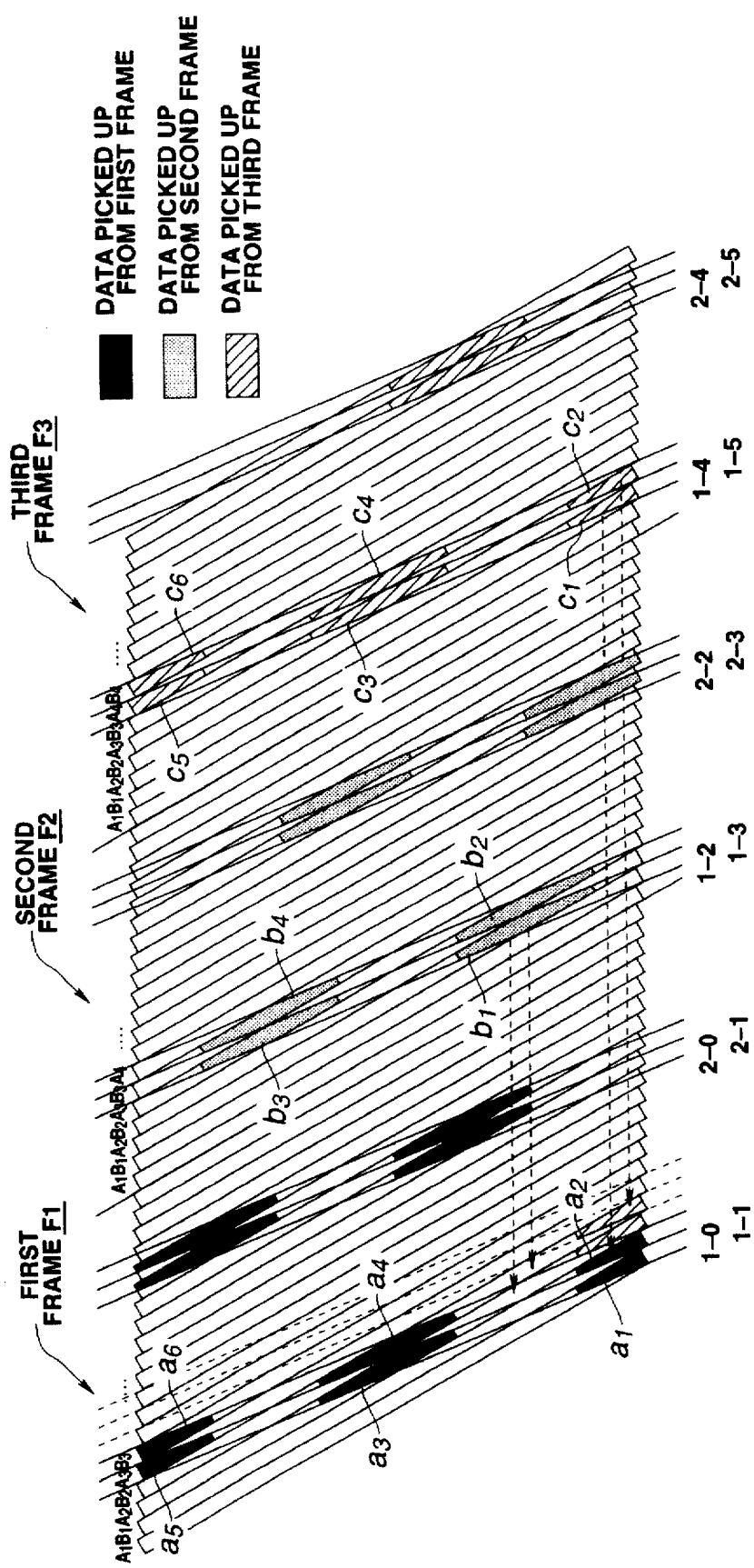
FIG. 8 illustrates positions of data recorded on the video tape by the above recording system.

During the tracing from 1-0 to 1-5 of the first rotary head, the tracing 1-0 and the tracing 1-1 for the first frame F1 pick up data of an area $a_1$ of a track $A_1$, data of an area $a_2$ of a track $B_1$, data of an area $a_3$ of a track $A_2$, data of an area $a_4$ of a track $B_2$, data of an area $a_5$ of a track $A_3$ and data of an area $a_6$ of a track $B_3$, for the first frame F1, as shown in FIG. 8.

The tracing 1-2 and the tracing 1-3 for the second frame F2 pick up data of an area $b_1$ of the track $A_2$, data of an area $b_2$ of the track $B_2$, data of an area $b_3$ of the track $A_3$ and data of an area $b_4$ of the track $B_3$, for the second frame F2.

On the other hand, the tracing 1-4 and the tracing 1-5 for the third frame F3 pick up data of an area $c_1$ of the track $A_2$, data of an area $c_2$ of the track $B_2$, data of an area $c_3$ of the track $A_3$, data of an area $c_4$ of the track $B_3$, data of an area $c_5$ of a track $A_4$ and data of an area $c_6$ of a track $B_4$, for the third frame F3.

The data of the respective frames, picked up by the respective tracings, are continuous data. For example, data of the area $b_1$ of the second frame F2, picked up by the tracing 1-2, are continuous to data of the area $a_3$ of the first frame F1 picked up by the first tracing 1-0, while data of the area $c_1$ of the third frame F3, picked up by the tracing 1-4, are continuous to data of the area $b_1$.

As for the tracing from 2-0 to 2-5 of the second head of the rotary head unit 1, similarly to the tracing of the first head, the picked-up data become continuous.

The data thus picked up from the respective frames are supplied to the picture display processor 8 via the signal processor 4.

The picture display processor 8 allocates the data picked up from the video tape 3 run by the driving controller 7 at the varying playback speed S to associated positions on the picture in order to display the picture.

Figure 9:
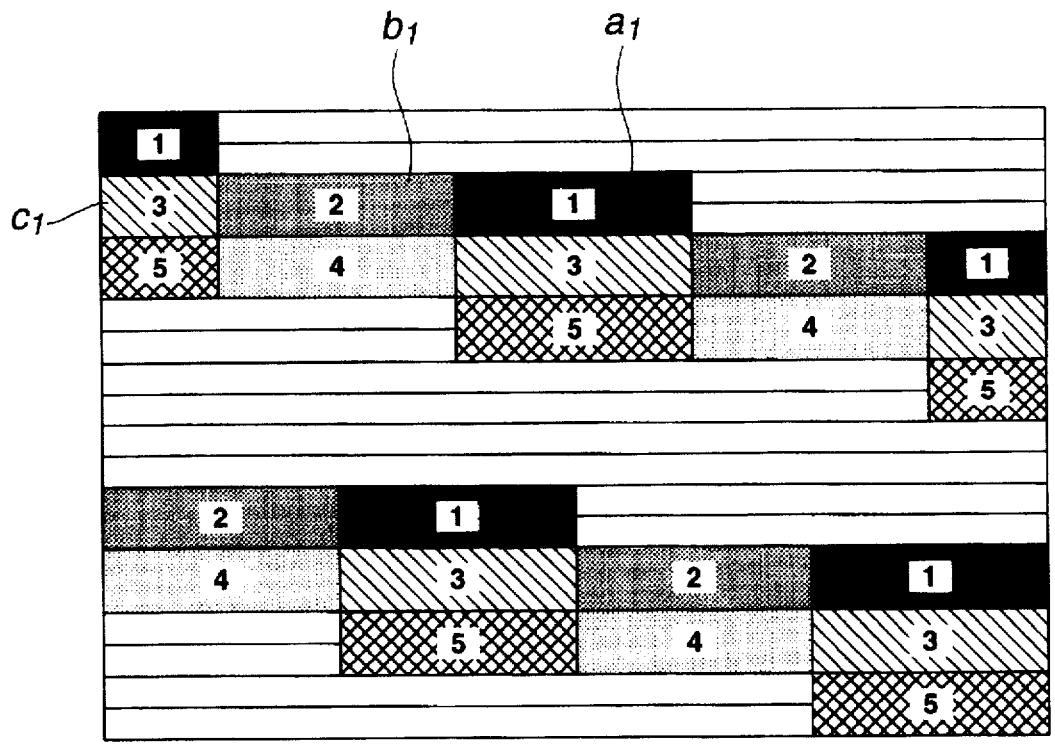
FIG. 9 illustrates data picked up by first 20 head tracings for a case in which continuous data can be picked up by the same head of the rotary head unit, with the varying reproducing speed being 5.25.
Figure 10:
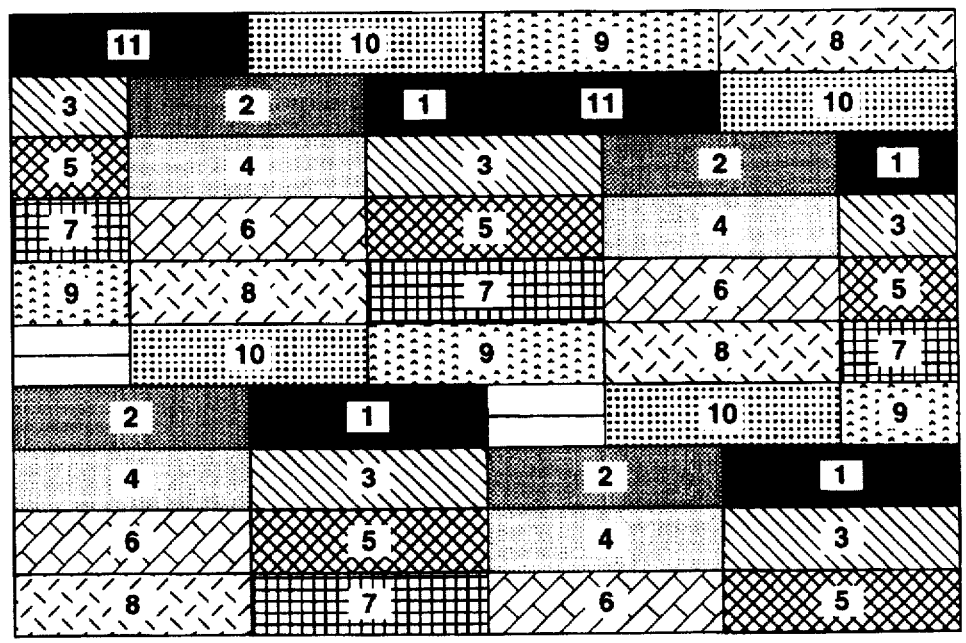
FIG. 10 illustrates data picked up by the next 20 head tracings for a case in which continuous data can be picked up by the same head of the rotary head unit, with the varying reproducing speed being 5.25.

For example, as shown in FIG. 9, the picture display processor 8 displays a fractional picture corresponding to data of the area $c_1$ in a picture area 3 which is an area located at a position associated with the data of the area $c_1$, while displaying a fractional picture corresponding to data of the area $b_1$ in a picture area 2 which is an area located at a position associated with the data of the area $b_1$. Similarly, the picture display processor 8 displays a fractional picture corresponding to data of the area $a_3$ in a picture area 1 which is an area located at a position associated with the data of the area $a_3$.

That is, the picture area 1 formed by data picked up from the first frame F1, the picture area 2 formed by data picked up from the second frame F2 and the picture area 3 formed by data picked up from the third frame F3 represent continuous fractional pictures.

If the first frame F1, second frame F2 and the third frame F3 are traced 20 times to produce one-frame data, and another one-frame data is produced by the next 20 times of tracing, the fractional picture 8 formed by data picked up from the eighth frame, the fractional picture 9 formed by data picked up from the ninth frame and the fractional picture 10 formed by data picked up from the tenth frame become continuous fractional pictures, by display processing by the picture display processor 8, as shown in FIG. 8. The fractional pictures 8, 9 and 10 correspond to macro-blocks. That is, the neighboring macro-blocks are made up of data of temporally proximate frames.

The operation of the digital VTR having the reproducing system for digital video signals as described above is now explained.

The normal playback mode or the varying speed playback mode is set at the entry unit 5, which then sends a corresponding mode setting signal to the system controller 6.

The system controller 8 is responsive to the mode setting signal from the entry unit 5 for controlling the operation of the entire system, such as the signal processor 4, driving controller 7 or the picture display processor 8.

The speed setting circuit 71 of the driving controller 7 operates, under control by the system controller 6, for setting the running speed of the video tape 3, driven by the driving circuit 72, to a varying playback speed S during the varying playback mode so that $$S = a(t \cdot m \pm 1)/n$$

for the number of heads equal to n, the constant a equal to 1 or 2, the number of tracks required for recording one-frame picture t and the constant m equal to an integer other than zero.

The driving circuit 72 runs the video tape S at the varying playback speed S as set by the speed setting circuit 71.

The encoded data, recorded on the video tape S, are read by the rotary head 1 so as to be supplied via the playback amplifier 2 to the signal processor 4.

The signal processor 4 demodulates data, read out by the rotary head 1, in accordance with a demodulating system associated with the modulating system of the recording side of the digital VTR, and routes the demodulated data to the picture display processor 8.

The picture display processor 8 allocates the data demodulated by the signal processor 4 to the positions on the picture which are associated with the demodulated data for displaying the picture.

By setting the running speed of the video tape S at the speed setting circuit 71 to the varying playback speed S shown by the equation (1) for varying speed reproduction so that the neighboring macro-blocks will be constituted by data of temporally proximate frames, the boundary lines between neighboring macro-blocks become less noticeable so that a spontaneous varying speed playback picture is obtained.

Figure 4:
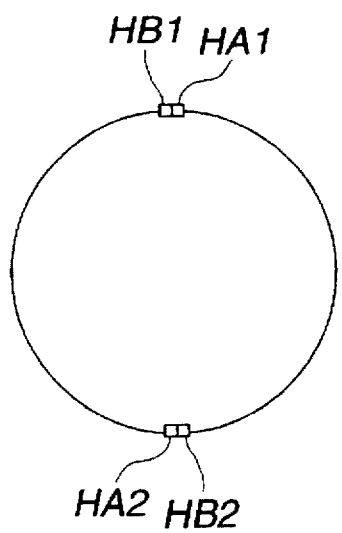
FIG. 4 illustrates the constitution of two pairs of double azimuth rotary heads of a rotary head unit employed in the reproducing apparatus shown in FIG. 3.
Figure 11:
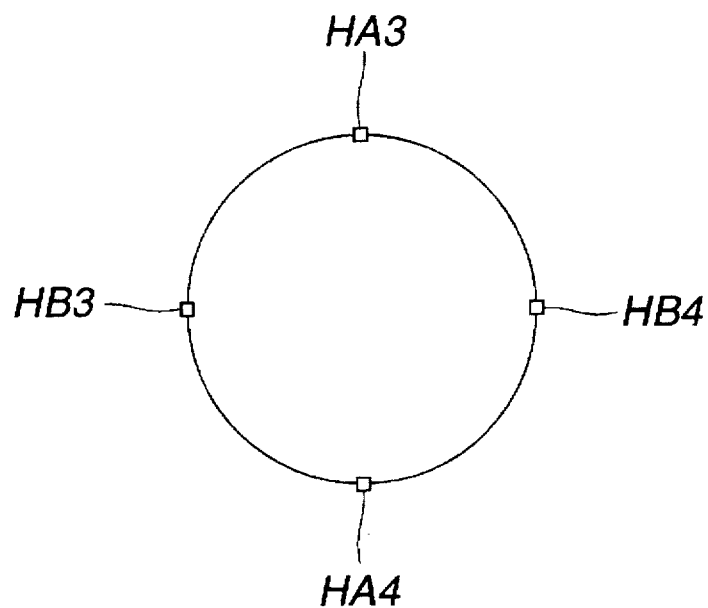
FIG. 11 shows an arrangement of two head pairs displaced by 180° from each other.

Although two pairs of double azimuth heads shown in FIG. 4 are used in the above-described embodiment, it is also possible to use two diametrically opposing double azimuth head pairs, made up of A azimuth heads HA3, HA4 arranged in diametrically opposite positions and B azimuth heads HB3 and HB4 similarly arranged at diametrically opposite positions, as shown in FIG. 11.

Although the rotary head unit 1 is so configured that continuous data will be picked up by the same head, it may also be configured so that continuous data will be picked up by the diametrically opposing heads.

More specifically, if, with the above equation (2), the running direction is the normal direction and the constants a and m are such that a=2 and m=1, that is the varying playback speed S=10.5, the driving circuit 72 runs the video tape 3 at the varying playback speed S=10.5 as set by the speed setting circuit 71.

In such case, as for the tracing from 1-0 to 1-3 of the first head of the rotary head unit 1, the tracing 1-0 and the tracing 1-1 for the first frame F1 pick up data of an area $d_1$ of the track $A_1$, data of an area $d_2$ of the track $B_1$, data of an area $d_3$ of the track $A_2$, data of an area $d_4$ of the track $B_2$, data of an area $d_5$ of the track $A_3$, data of an area $d_6$ of the track $B_3$, data of an area $d_7$ of the track $A_4$, data of an area $d_8$ of the track $B_4$, data of an area $d_9$ of a track $A_5$ and data of an area $d_{10}$ of a track $B_5$. As for the tracing 1-2 and the tracing 1-3 for the third frame F3, data of the areas $f_1$ to $f_{10}$ are picked up in a similar manner.

As for the tracings 2-0 and 2-1 of the second head of the rotary head unit 1, data of the areas $e_1$ to $e_{10}$ are picked up in a similar manner.

In this case, as in the case shown in FIG. 8 in which continuous data may be picked up by the same heads, data of the area $e_3$ of the second frame F2, picked up by the tracing 2-0, are continuous to data of the area $d_5$ of the first frame F1 picked up by the tracing 2-0, while data of the area $f_3$ of the third frame F3, picked up by the tracing 1-2, are continuous to data of the area $e_3$.

Figure 13:
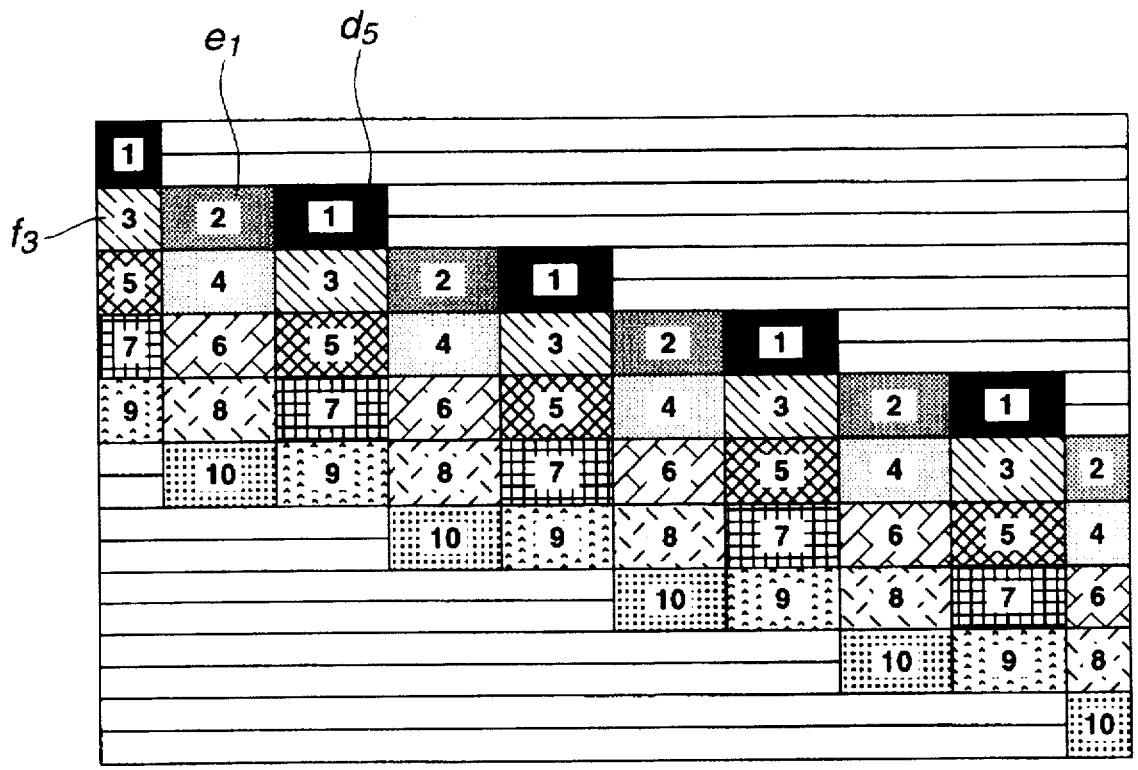
FIG. 13 illustrates data picked up by first 20 head tracings for a case in which continuous data can be picked up by the opposing heads of the rotary head unit, with the varying reproducing speed being 10.5.

By display processing by the picture display processor 8, the fractional picture corresponding to data of the area $f_3$ is displayed in a picture area 3 positioned in association with the data of the area $f_3$, as shown in FIG. 13. Similarly, the fractional picture corresponding to data of the area $e_3$ is displayed in a picture area 2 positioned in association with the data of the area $e_3$, while the fractional picture corresponding to data of the area $d_5$ is displayed in a picture area 1 positioned in association with the data of the area $d_5$. In this manner, the above picture data are allocated to the picture positions associated with the picked up data for displaying the fractional pictures.

Thus, in this case, the picture area 1 formed by the data picked up from the first frame F1, the picture area 2 formed by the data picked up from the second frame F2 and the picture area 3 formed by the data picked up from the third frame F3 become continuous picture areas.

Figure 14:
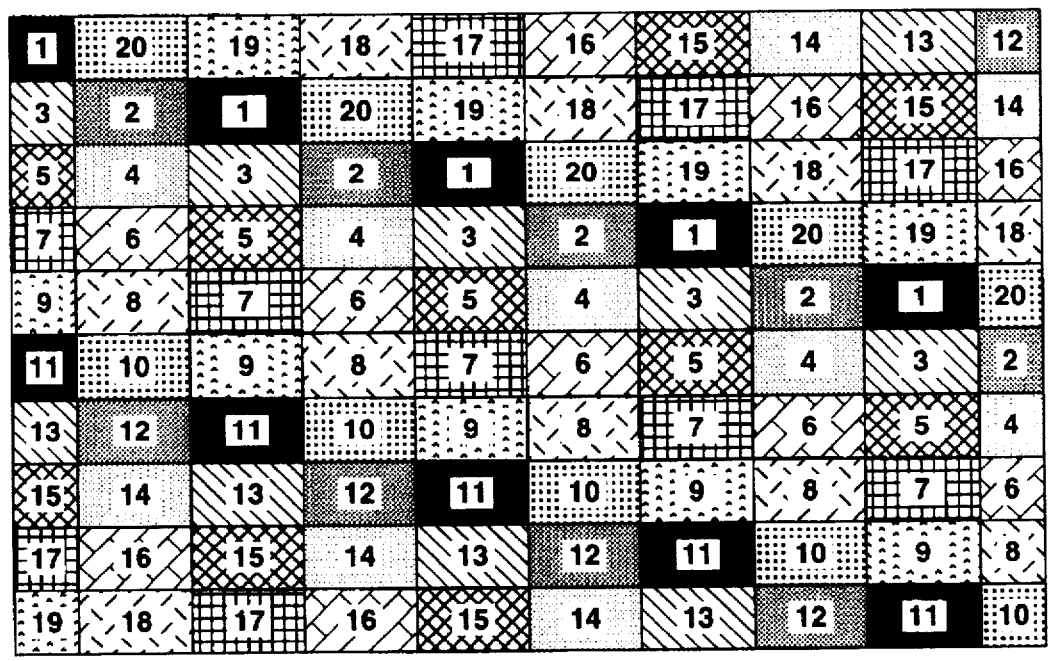
FIG. 14 illustrates data picked up by the next 20 head tracings for a case in which continuous data can be picked up by the opposing heads of the rotary head unit, with the varying reproducing speed being 10.5.

If the first frame F1, second frame F2 and the third frame F3 are traced 20 times to produce one-frame data, and another one-frame data is produced by the next 20 times of tracing, the fractional picture 20 formed by data picked up from the 20th frame, the fractional picture 19 formed by data picked up from the 19th frame and the fractional picture 18 formed by data picked up from the 18th frame, . . . become continuous fractional pictures, by display processing by the picture display processor 8, as shown in FIG. 14. That is, the neighboring macro-blocks are made up of data of temporally proximate frames.

The method for reproducing digital video signals according to the second embodiment of the present invention is explained.

The above-described method for reproducing digital video signals according to the first embodiment is carried out by the digital VTR having the playback system for digital video signals shown in FIG. 3, in which the rotary head unit is made up of two pairs of double azimuth heads, with the number of heads being four. The digital video signal reproducing method of the present second embodiment is carried out by the above-described digital VTR employing four pairs of the double azimuth heads, with the number of the heads being eight.

The parts specifying the same function as those of the first embodiment are depicted by the same numerals and the corresponding description is omitted for simplicity.

Figure 15:
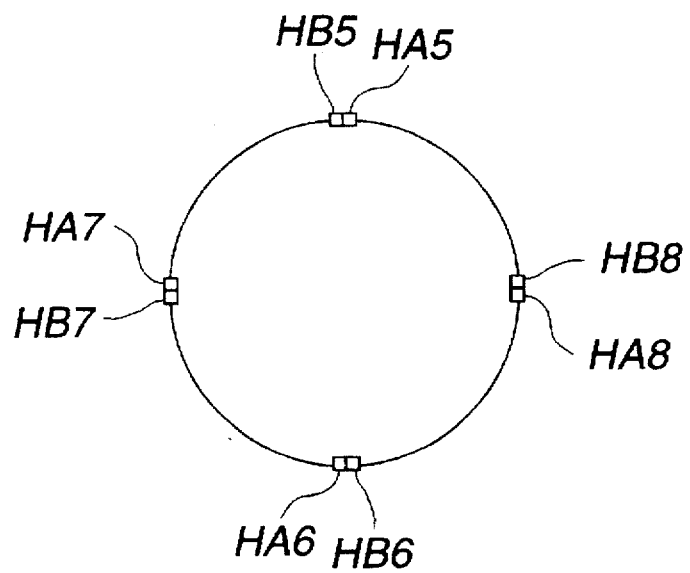
FIG. 15 illustrates the constitution of four pairs of double azimuth rotary heads employed as a rotary head unit in a reproducing apparatus for carrying out the digital video signal reproducing method according to a second embodiment of the present invention.
Figure 12:
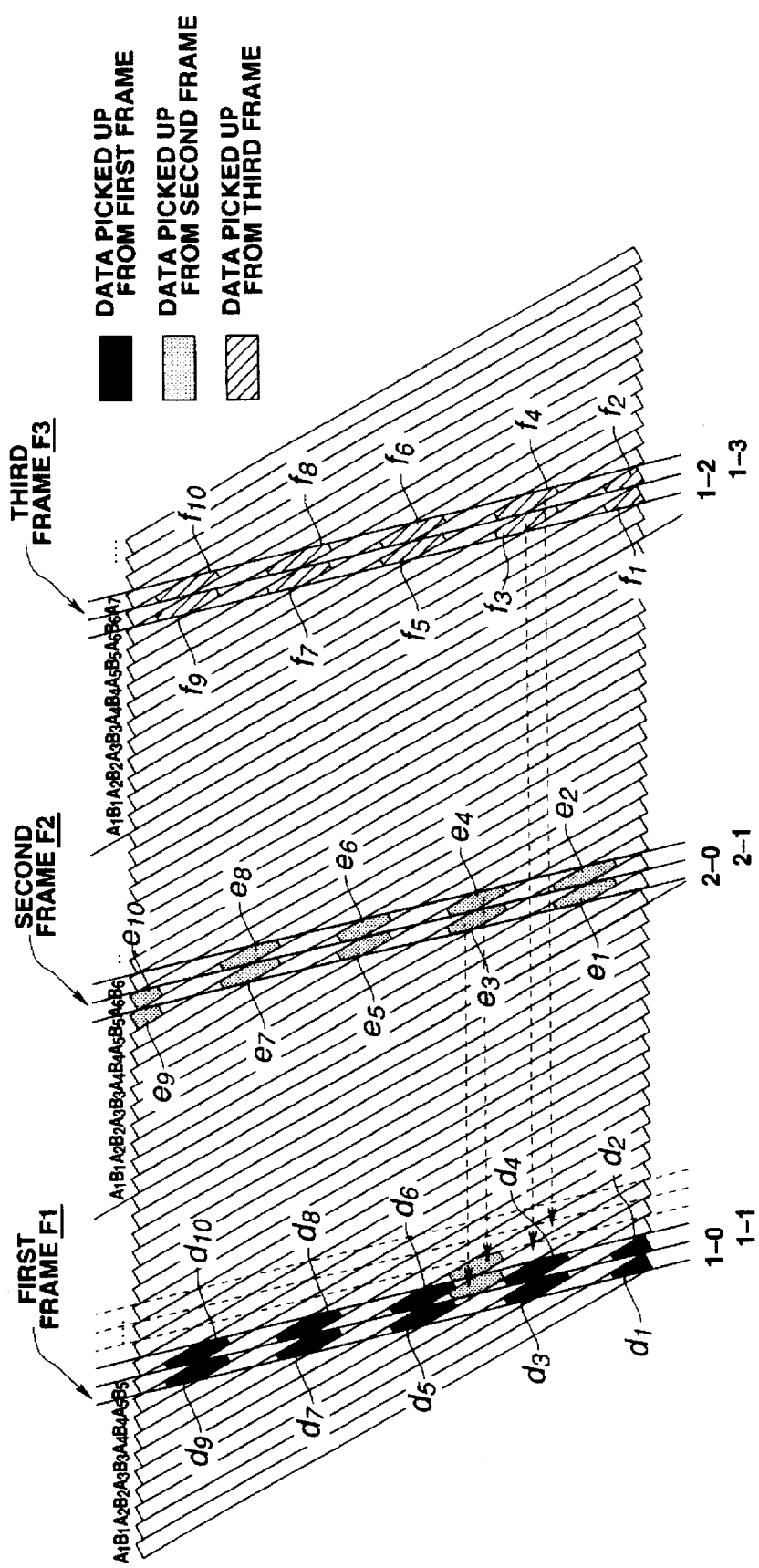
FIG. 12 illustrates head tracing for a case in which continuous data can be picked up by the opposing heads of the rotary head unit, with the varying reproducing speed being 10.5.

Referring to FIG. 15, the rotary head unit 1 is constituted by double azimuth heads (referred to herein as first heads), made up of an A azimuth head HA5 and a B azimuth head HB5, double azimuth heads (referred to herein as second heads), made up of an A azimuth head HA6 and a B azimuth head HB6, double azimuth heads (referred to herein as third heads), made up of an A azimuth head HA7 and a B azimuth head HB7, and double azimuth heads (referred to herein as fourth heads), made up of an A azimuth head HA8 and a B azimuth head HB8. The first heads and the second heads are arranged at diametrically opposite positions to each other, while the third heads and the fourth heads are similarly arranged at diametrically opposite positions to each other.

In this case, the running speed of the video tape 3 is set by the speed setting circuit 71 shown in FIG. 3 to a varying playback speed S such that $$S = (20m \pm 1)/8 \quad (3)$$
$$= a(2.5m \pm 0.125)$$

If assumed that, with the rotary head unit 1, continuous data can be picked up by the same heads, the running direction is the normal direction and a=1 and m=1, that is the varying playback speed S=2.625, the driving circuit 72 runs the video tape 3 with the varying playback speed S=2.625 as set by the speed setting unit 71.

Thus, as for the tracing from 1-0 to 1-5 of the first head of the rotary head unit 1, the tracing 1-0 and the tracing 1-1 for the first frame F1 pick up data of an area $g_1$ of track $A_1$, data of an area $g_2$ of track $B_1$, data of an area $g_3$ of track $A_2$ and data of an area $g_4$ of track $B_2$, for the first frame F1. The tracing 1-2 and the tracing 1-3 for the second frame F2 pick up data of an area $h_1$ of track $A_2$ and data of an area $h_2$ of track $B_2$ for the second frame F2.

On the other hand, the tracing 1-4 and the tracing 1-5 for the third frame F3 pick up data of an area $i_1$ of track $A_2$, data of an area $i_2$ of track $B_2$, data of an area $i_3$ of track $A_3$ and data of an area $l_4$ of track $B_3$, for the third frame F3.

As described above, data of the area $h_1$ for the second frame F2, picked up by the tracing 1-2, is continuous to data of the area $g_3$ of the first frame F1 picked up by the tracing 1-0, while data of the area $i_1$ for the third frame F3, picked up by the tracing 1-4, is continuous to data of the area $h_1$.

As for the tracing of the second to the fourth heads, similarly to the tracing of the first head, described above, the data picked up become continuous data.

The data thus picked up from the respective frames are sent via the signal processor 4 to the picture display processor 8.

The picture display processor 8 allocates data picked up from the video tape 3 run at the varying playback speed by the driving controller 7 to picture positions associated with the data for displaying the picture.

Figure 17:
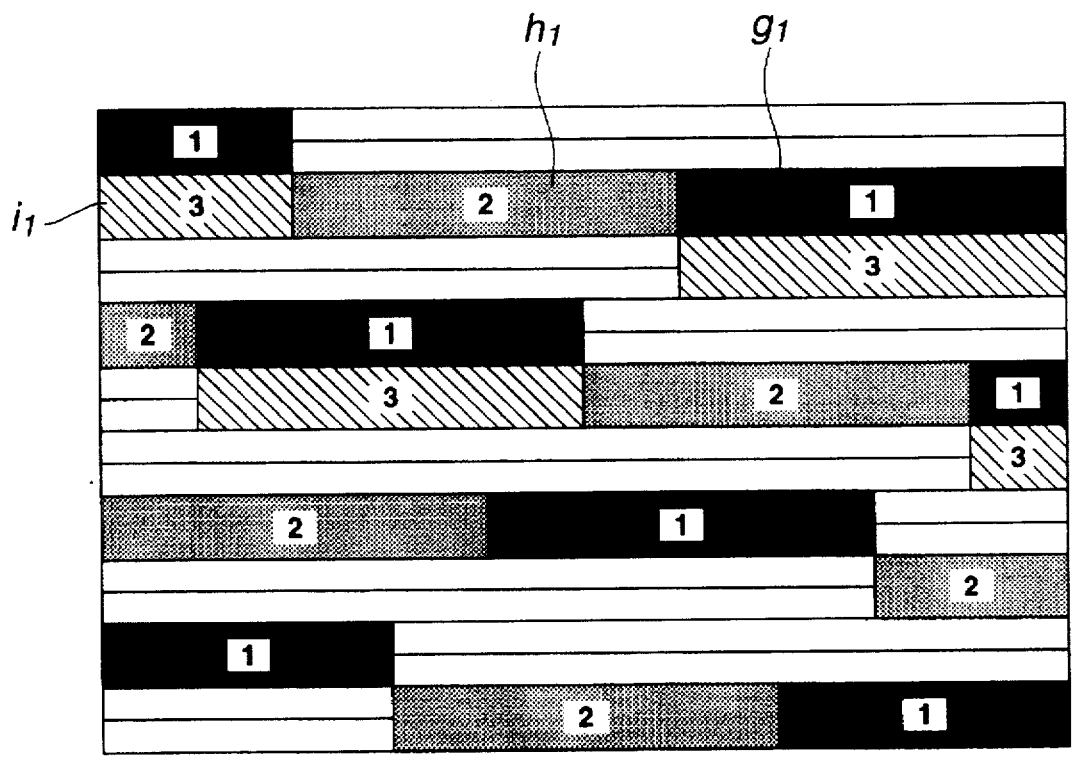
FIG. 17 illustrates data picked up by first 20 head tracings for a case in which continuous data can be picked up by the same head, with the varying reproducing speed being 2.625.

Referring to FIG. 17, the picture display processor 8 displays data of the area $i_1$ at a picture area 3 positioned in association with the data of the area $i_1$. The picture display processor 8 also displays data of the area $h_1$ at a picture area 2 positioned in association with the data of the area $h_1$, while displaying data of the area $g_3$ at a picture area 1 positioned in association with the data of the area $g_3$.

Thus the picture area 1 formed by the data picked up from the first frame F1, the picture area 2 formed by the data picked up from the second frame F2 and the picture area 3 formed by the data picked up from the third frame F3 become continuous picture areas.

Figure 18:
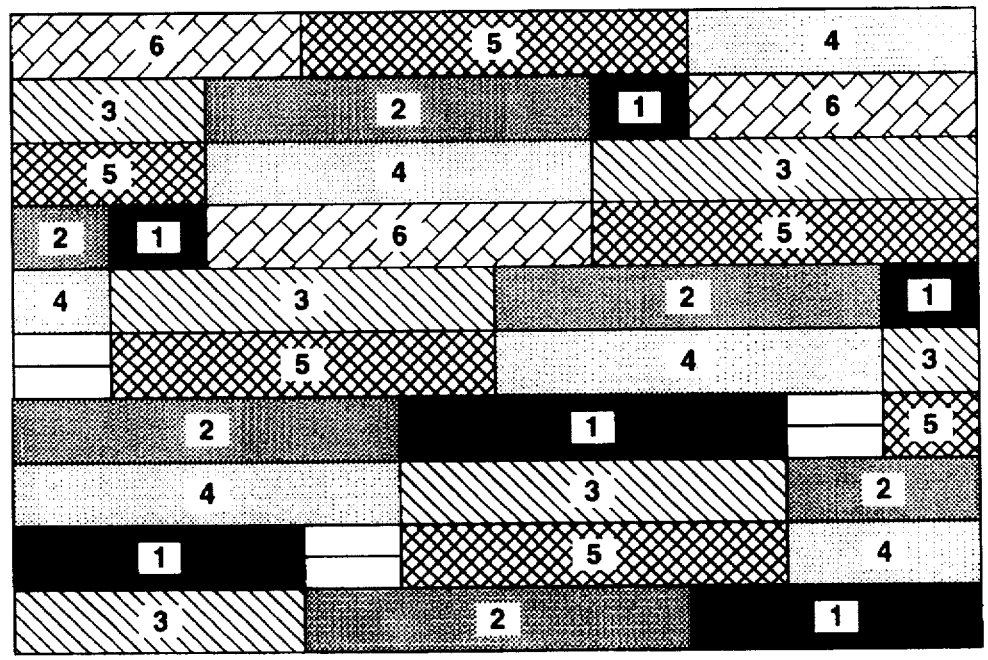
FIG. 18 illustrates data picked up by the next 20 head tracings for a case in which continuous data can be picked up by the same head, with the varying reproducing speed being 2.625.

If the first frame F1, second frame F2 and the third frame F3 are traced 20 times to produce one-frame data, and another one-frame data is produced by the next 20 tracings, the fractional picture 6 formed by data picked up from the sixth frame, the fractional picture 5 formed by data picked up from the fifth frame and the fractional picture 4 formed by data picked up from the fourth frame become continuous fractional pictures, by display processing by the picture display processor 8, as shown in FIG. 18. That is, the neighboring macro-blocks are made up of data of temporally proximate frames.

By setting the running speed of the video tape 3 at the speed setting circuit 71 to the varying playback speed S shown by the equation (1) for varying speed reproduction so that the neighboring macro-blocks will be constituted by data of temporally proximate frames, as in the above-described first embodiment, the boundary lines between neighboring macro-blocks become less noticeable so that a spontaneous varying speed playback picture is obtained.

Although the rotary head unit 1 is so configured that continuous data will be picked up by the same heads, it may also be configured so that continuous data will be picked up by the diametrically opposing heads.

More specifically, if, with the above equation (3), the running direction is the normal direction and the constants a and m are such that a=2 and m=1, that is the varying playback speed S is such that S=5.25, the driving circuit 72 runs the video tape 3 at the varying playback speed S=5.25 as set by the speed setting circuit 71.

Figure 19:
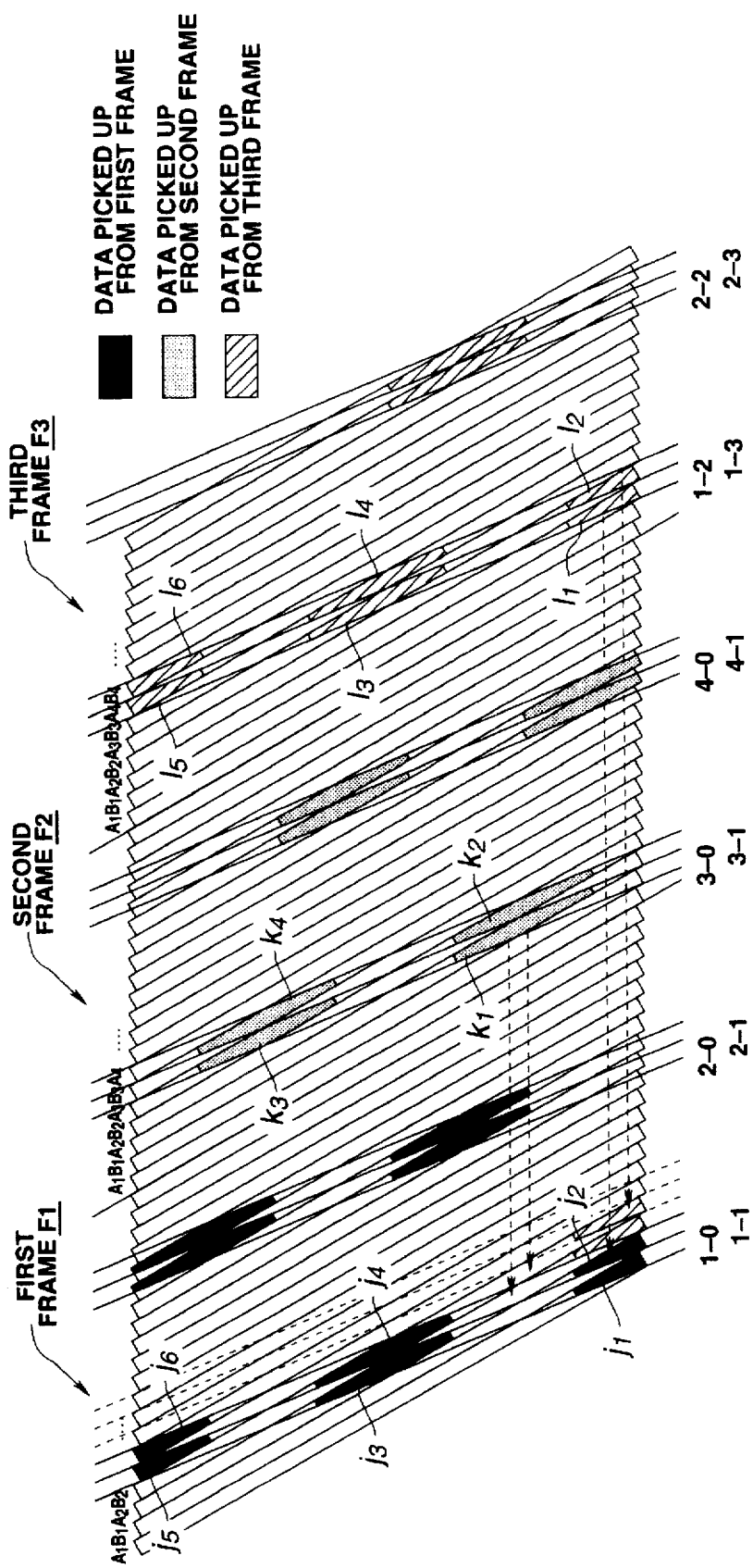
FIG. 19 illustrates head tracing for a case in which continuous data can be picked up by the opposing heads of the rotary head unit, with the varying reproducing speed being 5.25.

In this case, as for the tracing from 1-0 to 1-3 of the first head, the tracing 1-0 and the tracing 1-1 for the first frame F1 pick up data of an area $j_1$ of track $A_1$, data of an area $j_2$ of track $B_1$, data of an area $j_3$ of track $A_2$ and data of an area $j_4$ of track $B_2$, data of an area $j_5$ of track $A_3$ and data of an area $j_6$ of track $B_3$, as shown in FIG. 19. As for the tracing 1-2 and the tracing 1-3 of the third frame F-3, data of the areas $l_1$ to $l_6$ are picked up in a similar manner. As for the tracing 3-0 and the tracing 3-1 of the third head, data of the areas $k_1$ to $k_4$ are picked up by the tracing 3-0 and the tracing 3-1 for the second frame F-2.

As for the tracing from 2-0 to 2-3 of the second head and the tracing 4-0 and the tracing 4-1 of the fourth head, data can be picked up in a similar manner.

Figure 16:
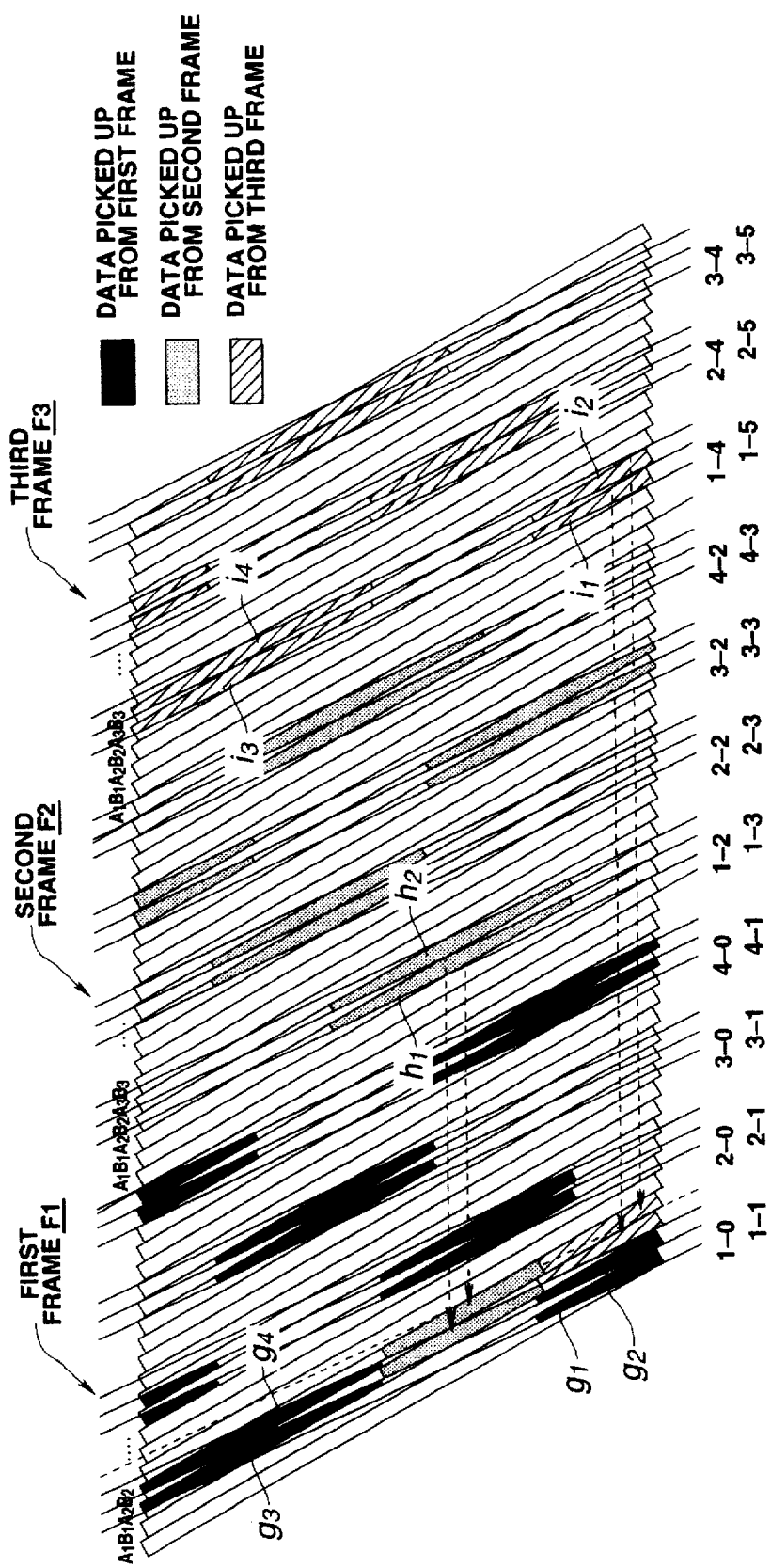
FIG. 16 illustrates head tracing for a case in which continuous data can be picked up by the same head of the rotary head unit, with the varying reproducing speed being 2.625.

In the present case, similarly to the case of FIG. 16 in which continuous data can be picked up by the same heads, data of the area $k_1$ of the second frame F2 picked up by the tracing 3-0 is continuous to data of the area $j_3$ of the first frame F1 picked up by the tracing 1-0, while data of the area $l_1$ of the third frame F3 picked up by the tracing 1-2 is continuous to data of the area $k_1$.

Figure 20:
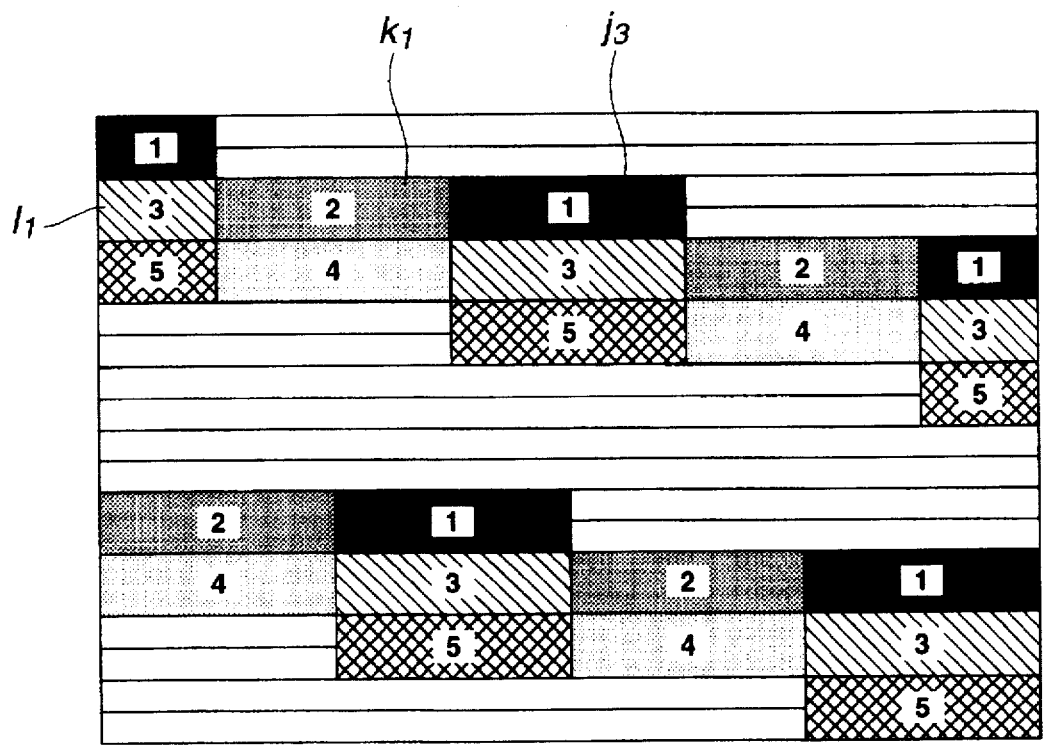
FIG. 20 illustrates data picked up by first 20 head tracings for a case in which continuous data can be picked up by the opposing heads of the rotary head unit, with the varying reproducing speed being 5.25.

By display processing by the picture display processor 8, the fractional picture corresponding to data of the area $l_1$ is displayed in a picture area 3 positioned in association with the data of the area $l_1$, as shown in FIG. 20. Similarly, the fractional picture corresponding to data of the area $k_1$ is displayed in a picture area 2 positioned in association with the data of the area $k_1$, while the fractional picture corresponding to data of the area $j_3$ is displayed in a picture area 1 positioned in association with the data of the area $j_3$. In this manner, the picked up picture data are allocated to the picture positions associated with the picked up data for displaying the fractional pictures.

Thus, in this case, the picture area 1 formed by the data picked up from the first frame F1, the picture area 2 formed by the data picked up from the second frame F2 and the picture area 3 formed by the data picked up from the third frame F3 become continuous picture areas.

Figure 21:
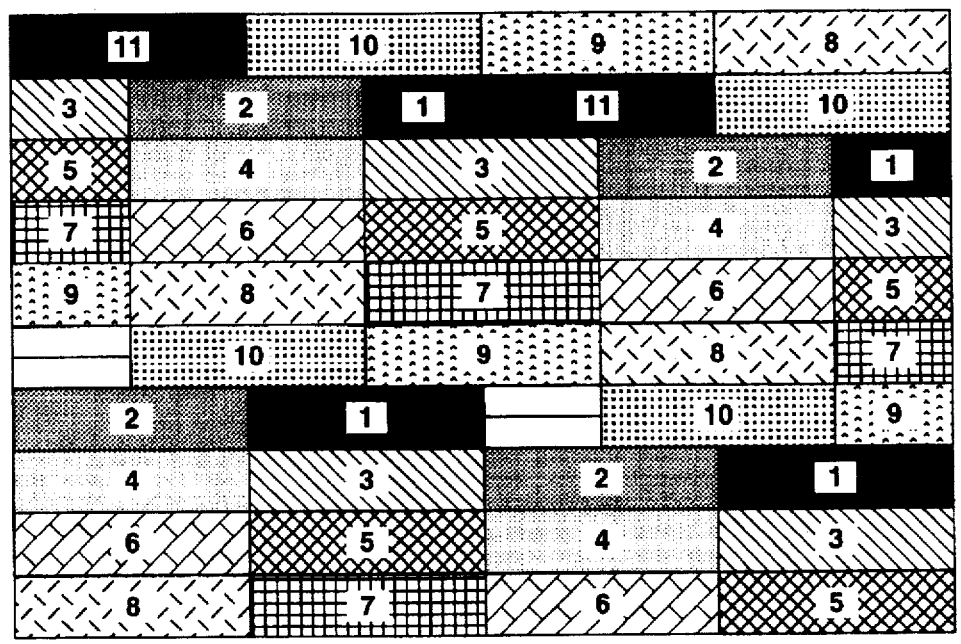
FIG. 21 illustrates data picked up by the next 20 head tracings for a case in which continuous data can be picked up by the opposing heads of the rotary head unit, with the varying reproducing speed being 5.25.

If the first frame F1, second frame F2 and the third frame F3 are traced 20 times to produce one-frame data, and another one-frame data is produced by the next 20 times of tracing, the fractional picture 20 formed by data picked up from the 20th frame, the fractional picture 19 formed by data picked up from the 19th frame and the fractional picture 18 formed by data picked up from the 18th frame, . . . become continuous fractional pictures, by display processing by the picture display processor 8, as shown in FIG. 21. That is, the neighboring macro-blocks are made up of data of temporally proximate frames.

What is claimed is:

1. A method for reproducing digital video signals that had been recorded on a recording medium by an inclined azimuth recording system, wherein the improvement comprises the step of varying speed reproduction S such that $S=a(t*m\pm1)/n$ where n is the number of heads, a is a constant of 1 or 2, t is the number of tracks on which one-frame data of the digital video signals is recorded, m is a constant which is an integer other than 0, and the ratio of a to n is not 0.5.

2. The method as claimed in claim 1, wherein the digital video signals read out with the varying playback speed are allocated and displayed at positions on a picture associated with the digital video signals.

3. The method as claimed in claim 1, wherein the varying playback speed is determined discretely.

4. The method as claimed in claim 1, wherein the combination of the plural heads reproducing the signals is switched depending upon the varying playback speed during the varying speed reproduction.

5. The method as claimed in claim 1, wherein the number of the plural heads is 4 or 8.

6. The method as claimed in claim 1, wherein the number of heads (n) in said rotary head unit is other than 2.

7. A method for reproducing digital video signals that had been recorded on a recording medium by an inclined azimuth recording system, comprising the steps of:

advancing said recording medium at an adjustable playback speed;

tracing paths along said recording medium with n playback heads;

varying the speed of reproduction by setting said playback speed to S, where $S=a(t*m\pm1)/n$, n is the number of heads, a is a constant of 1 or 2, t is the number of tracks on which one-frame data of the digital video signals is recorded, and m is a constant which is an integer other than 0, and the ratio of a to n is not 0.5; and when the number of heads is 4, said heads are arranged in two diametrically opposing pairs, circularly spaced apart from one another so that the paths traced along said recording medium by any two of said heads are not adjacent to one another.

* * * * *